(12) United States Patent
Peters

(10) Patent No.: US 10,208,615 B2
(45) Date of Patent: Feb. 19, 2019

(54) SEAL SHOE FOR A HYDROSTATIC NON-CONTACT SEAL DEVICE

(71) Applicant: United Technologies Corporation, Farmington, CT (US)

(72) Inventor: Christopher J. Peters, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 16/020,077

(22) Filed: Jun. 27, 2018

(65) Prior Publication Data

US 2018/0306046 A1    Oct. 25, 2018

Related U.S. Application Data

(63) Continuation of application No. 15/004,533, filed on Jan. 22, 2016, now Pat. No. 10,030,531.

(51) Int. Cl.

| | |
|---|---|
| *F01D 11/12* | (2006.01) |
| *F03B 3/16* | (2006.01) |
| *F01D 9/02* | (2006.01) |
| *F01D 5/02* | (2006.01) |
| *F03B 3/12* | (2006.01) |
| *F03D 3/04* | (2006.01) |
| *F01D 11/02* | (2006.01) |

(Continued)

(52) U.S. Cl.

CPC ............ *F01D 11/12* (2013.01); *F01D 5/02* (2013.01); *F01D 9/02* (2013.01); *F01D 11/025* (2013.01); *F03B 3/12* (2013.01); *F03B 3/16* (2013.01); *F03D 3/04* (2013.01); *F03D 3/06* (2013.01); *F16J 15/442* (2013.01); *F05B 2240/57* (2013.01); *F05D 2220/32* (2013.01)

(58) Field of Classification Search

CPC .......... F16J 15/442; F16J 15/441; F01D 5/02; F01D 11/025; F01D 11/12; F05B 2240/57

See application file for complete search history.

(56) References Cited

U.S. PATENT DOCUMENTS 4,017,088 A * 4/1977 Lerjen .................... F16J 15/441
                                                        277/416
7,410,173 B2 * 8/2008 Justak .................... F01D 11/00
                                                        277/355

(Continued)

FOREIGN PATENT DOCUMENTS

CA        2403664        7/2007
CA        2536362        2/2013

(Continued)

*Primary Examiner* — Eugene G Byrd
(74) *Attorney, Agent, or Firm* — O'Shea Getz P.C.

(57) ABSTRACT

A non-contact seal assembly is provided. This assembly includes a plurality of seal shoes, a seal base and a plurality of spring elements. The seal shoes are arranged about a centerline in an annular array. The seal shoes include a first seal shoe extending axially along the centerline between a first shoe end and a second shoe end. An aperture may extend partially axially into the first seal shoe from the first shoe end and laterally within the first seal shoe. The seal base circumscribes the annular array of the seal shoes. Each of the spring elements is radially between and connects a respective one of the seal shoes with the seal base.

21 Claims, 13 Drawing Sheets

(51) Int. Cl.
*F03D 3/06* (2006.01)
*F16J 15/44* (2006.01)

(56) References Cited

U.S. PATENT DOCUMENTS

| | | | | |
|---|---|---|---|---|
| 7,896,352 B2 * | 3/2011 | Justak | .................... | F16J 15/442 |
| | | | | 277/411 |
| 8,002,285 B2 * | 8/2011 | Justak | .................... | F01D 11/02 |
| | | | | 277/412 |
| 8,172,232 B2 * | 5/2012 | Justak | .................... | F16J 15/442 |
| | | | | 277/411 |
| 8,641,045 B2 * | 2/2014 | Justak | .................... | F16J 15/442 |
| | | | | 277/412 |
| 8,919,781 B2 * | 12/2014 | Justak | .................... | F01D 11/025 |
| | | | | 277/411 |
| 9,045,994 B2 * | 6/2015 | Bidkar | .................... | F01D 11/02 |
| 9,115,810 B2 * | 8/2015 | Bidkar | .................... | F16J 15/447 |
| 9,587,746 B2 * | 3/2017 | Bidkar | .................... | F01D 11/025 |
| 2003/0080513 A1 * | 5/2003 | Kirby, III | .................... | F16J 15/441 |
| | | | | 277/416 |
| 2014/0008871 A1 * | 1/2014 | Bidkar | .................... | F16J 15/447 |
| | | | | 277/303 |
| 2018/0058240 A1 * | 3/2018 | Chuong | .................... | F01D 5/02 |

FOREIGN PATENT DOCUMENTS

| | | |
|---|---|---|
| CA | 2675597 | 5/2015 |
| DE | 426658 | 3/1926 |
| DE | 19735932 | 2/1999 |
| EP | 1942294 | 7/2008 |
| EP | 2279364 | 5/2009 |
| EP | 2286119 | 2/2011 |
| EP | 2299062 | 3/2011 |
| EP | 2665897 | 11/2013 |
| EP | 2137383 | 12/2013 |
| JP | S61108808 | 5/1986 |
| WO | 2014150825 | 9/2014 |

* cited by examiner

SEAL SHOE FOR A HYDROSTATIC NON-CONTACT SEAL DEVICE

This patent application is a continuation of and claims priority to U.S. patent application Ser. No. 15/004,533 filed Jan. 22, 2016, which is hereby incorporated herein by reference in its entirety.

This invention was made with Government support under Contract No. FA8650-09-D-2923-AETD awarded by the United States Air Force. The Government has certain rights in the invention.

BACKGROUND OF THE INVENTION

1. Technical Field

This disclosure relates generally to rotational equipment and, more particularly, to a non-contact seal assembly for rotational equipment.

2. Background Information

Rotational equipment typically includes one or more seal assemblies for sealing gaps between rotors and stators. A typical seal assembly includes a contact seal with a seal element such as a knife edge seal that engages a seal land. Such a contact seal, however, can generate a significant quantity of heat which can reduce efficiency of the rotational equipment as well as subject other components of the rotational equipment to high temperatures and internal stresses. To accommodate the high temperatures and stresses, certain components of the rotational equipment may be constructed from specialty high temperature materials, which can significantly increase the manufacturing and servicing costs as well as the mass of the rotational equipment. While non-contact seals have been developed in an effort to reduce heat within rotational equipment, there is still room for improvement to provide an improved non-contact seal.

SUMMARY OF THE DISCLOSURE

According to an aspect of the present disclosure, a non-contact seal assembly is provided. This assembly includes a plurality of seal shoes, a seal base and a plurality of spring elements. The seal shoes are arranged about a centerline in an annular array. The seal shoes include a first seal shoe extending axially along the centerline between a first shoe end and a second shoe end. An aperture extends partially axially into the first seal shoe from the first shoe end and laterally within the first seal shoe. The seal base circumscribes the annular array of the seal shoes. Each of the spring elements is radially between and connects a respective one of the seal shoes with the seal base.

According to another aspect of the present disclosure, another non-contact seal assembly is provided. This assembly includes a plurality of seal shoes, a seal base and a plurality of spring elements. The seal shoes are arranged about a centerline in an annular array. The seal shoes include a first seal shoe extending axially along the centerline between a first shoe end and a second shoe end. An aperture extends partially axially into the first seal shoe from the first shoe end and laterally through the first seal shoe along an entire lateral length of the first seal shoe. The seal base circumscribes the annular array of the seal shoes. Each of the spring elements is radially between and connects a respective one of the seal shoes with the seal base.

According to another aspect of the present disclosure, another non-contact seal assembly is provided. This assembly includes a plurality of seal shoes, a seal base and a plurality of spring elements. The seal shoes are arranged about a centerline in an annular array. The seal shoes includes a first seal shoe extending axially along the centerline between a first shoe end and a second shoe end. The first seal shoe includes a major region and a minor region disposed within the major region at the first shoe end. The minor region has a mass/volume ratio that is less than a mass/volume ratio of the major region. The seal base circumscribes the annular array of the seal shoes. Each of the spring elements is radially between and connects a respective one of the seal shoes with the seal base.

According to still another aspect of the present disclosure, an assembly is provided for rotational equipment with an axial centerline. This assembly includes a stator structure, a rotor structure and a seal assembly. The seal assembly is configured to substantially seal an annular gap between the stator structure and the rotor structure. The seal assembly includes a hydrostatic non-contact seal device, which includes a plurality of seal shoes, a seal base and a plurality of spring elements. The seal shoes are arranged about a centerline in an annular array. The seal shoes sealingly engage the rotor structure and include a first seal shoe extending axially along the centerline between a first shoe end and a second shoe end. An aperture extends partially axially into the first seal shoe from the first shoe end and laterally within the first seal shoe. The seal shoes circumscribe and sealingly engage the rotor structure. The seal base circumscribes the annular array of the seal shoes. The seal base is mounted with the stator structure. Each of the spring elements is radially between and connects a respective one of the seal shoes with the seal base.

The stator structure and the rotor structure may be configured for a turbine engine.

The aperture may extend partially radially into the first seal shoe from an outer radial surface of the first seal shoe.

The aperture may extend radially within the first seal shoe.

The aperture may be one of a plurality of apertures extending axially into the first seal shoe from the first shoe end and circumferentially within the first seal shoe.

The apertures may be formed by a lattice structure.

The aperture may be at least partially filled with a material having a density which is less than material from which another portion of the first seal shoe is formed.

The first seal shoe may extend circumferentially, at the first shoe end, between a first shoe side and a second shoe side for a seal shoe length. The aperture may extend laterally within the first seal shoe for an aperture length which is between about fifty percent and about eighty percent of the seal shoe length. Alternatively, the aperture length may be between about ten percent and about fifty percent of the seal shoe length. Still alternatively, the aperture length may be between about one percent and about ten percent of the seal shoe length.

The seal shoes may collectively form a substantially annular end surface at the second end.

A ring structure and a secondary seal device may be included. The ring structure may be axially engaged with the seal base. The secondary seal device may be mounted with the ring structure and axially engaged with the substantially annular end surface. The secondary seal device may be configured to substantially seal an annular gap between the ring structure and the annular array of the seal shoes.

The minor region may be configured as a portion of the first seal shoe at the first shoe end with a plurality of apertures therein.

A first of the apertures may extend partially axially into the first seal shoe from the first shoe end and laterally within the first seal shoe.

The minor region may be configured with a lattice structure.

The minor region may be configured with a cellular structure.

The major region may be configured from or include a first material. The minor region may be configured from or include a second material different from the first material. Alternatively, the second material may be the same as the first material.

The foregoing features and the operation of the invention will become more apparent in light of the following description and the accompanying drawings.

DETAILED DESCRIPTION OF THE INVENTION

Figure 1:
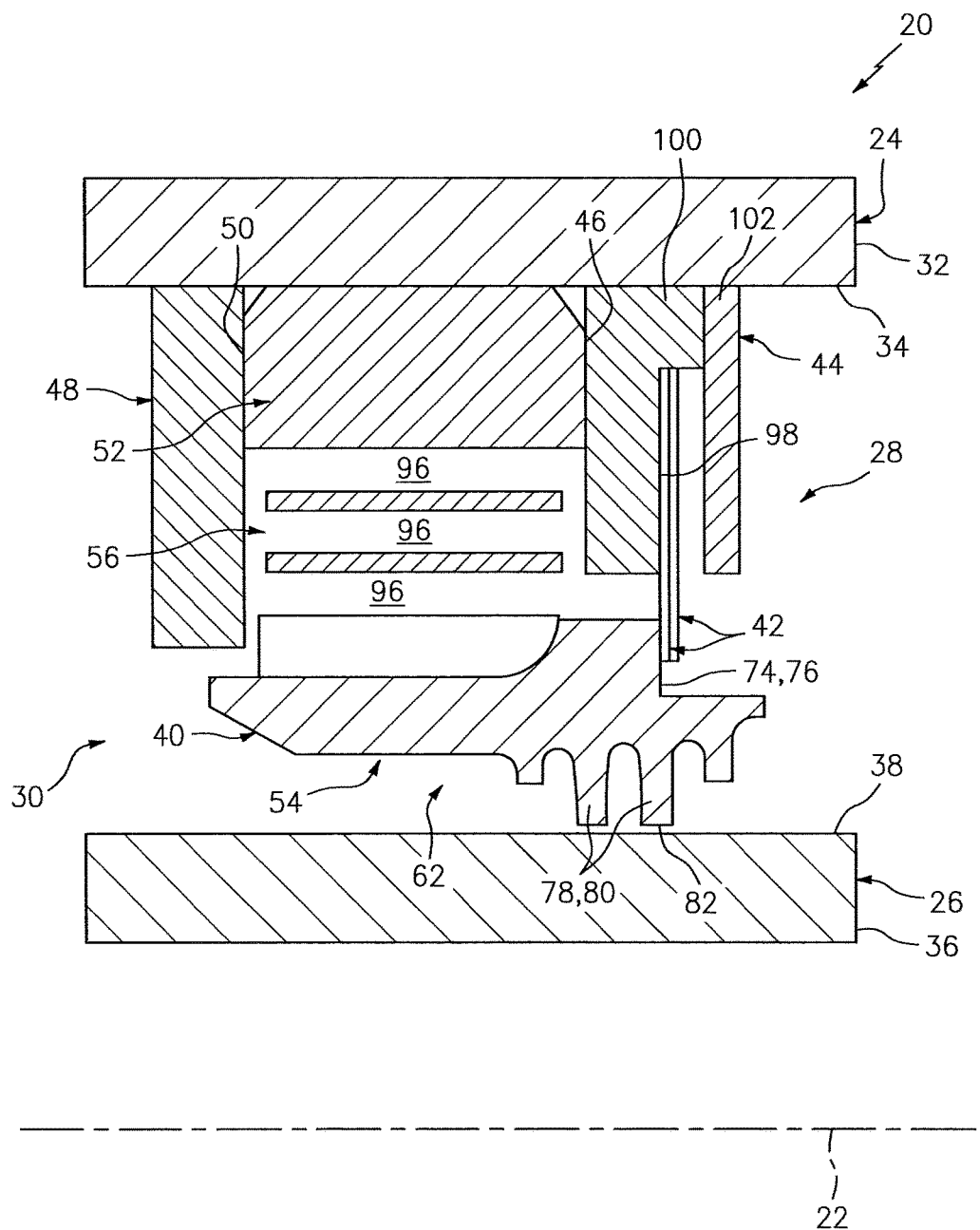
FIG. 1 is a top-half side sectional illustration of an assembly for rotational equipment.

FIG. 1 illustrates an assembly 20 for rotational equipment with an axial centerline 22. An example of such rotational equipment is a gas turbine engine for an aircraft propulsion system, an exemplary embodiment of which is described below in further detail. However, the assembly 20 of the present disclosure is not limited to such an aircraft or gas turbine engine application. The assembly 20, for example, may alternatively be configured with rotational equipment such as an industrial gas turbine engine, a wind turbine, a water turbine or any other apparatus in which a seal is provided between a stator structure and a rotor structure.

The assembly 20 of FIG. 1 includes a stator structure 24, a rotor structure 26 and a seal assembly 28. This seal assembly 28 is mounted with the stator structure 24, and configured to substantially seal an annular gap 30 between the stator structure 24 and the rotor structure 26 as described below in further detail.

The stator structure 24 includes a seal carrier 32. This seal carrier 32 may be a discrete, unitary annular body. Alternatively, the seal carrier 32 may be configured with another component/portion of the stator structure 24. The seal carrier 32 has an inner radial seal carrier surface 34. This seal carrier surface 34 may be substantially cylindrical, and extends circumferentially around and faces towards the axial centerline 22. The seal carrier surface 34 at least partially forms a bore in the stator structure 24. This bore is sized to receive the seal assembly 28, which may be fixedly attached to the seal carrier 32 by, for example, a press fit connection between the seal assembly 28 and the seal carrier surface 34.

The rotor structure 26 includes a seal land 36. This seal land 36 may be a discrete, unitary annular body. Alternatively, the seal land 36 may be configured with another component/portion of the rotor structure 26. The seal land 36 has an outer radial seal land surface 38. This seal land surface 38 may be substantially cylindrical, and extends circumferentially around and faces away from the axial centerline 22. The seal land surface 38 is disposed to face towards and is axially aligned with the seal carrier surface 34. While FIG. 1 illustrates the surfaces 34 and 38 with approximately equal axial lengths along the axial centerline 22, the seal land surface 38 may alternatively be longer or shorter than the seal carrier surface 34 in other embodiments.

The seal assembly 28 includes a primary seal device 40 and one or more secondary seal devices 42; e.g., 1, 2, 3 or more secondary seal devices 42. The seal assembly 28 also includes one or more additional components for positioning, supporting and/or mounting one or more of the seal devices 40 and 42 with the stator structure 24. The seal assembly 28 of FIG. 1, for example, includes a first ring structure 44 configured for positioning, supporting and/or mounting the secondary seal devices 42 relative to the primary seal device 40. This first ring structure 44 may also be configured for axially positioning and/or supporting a second end surface 46 of the primary seal device 40 relative to the stator structure 24. The seal assembly 28 of FIG. 1 also includes a second ring structure 48 (e.g., a scalloped support ring) configured for axially positioning and/or supporting a first end surface 50 of the primary seal device 40 relative to the stator structure 24. However, the second ring structure 48 may be omitted where, for example, the first end surface 50 of the primary seal device 40 may be abutted against another component/portion of the stator structure 24 (e.g., an annular or castellated shoulder) or otherwise axially positioned/ secure with the stator structure 24.

Figure 2:
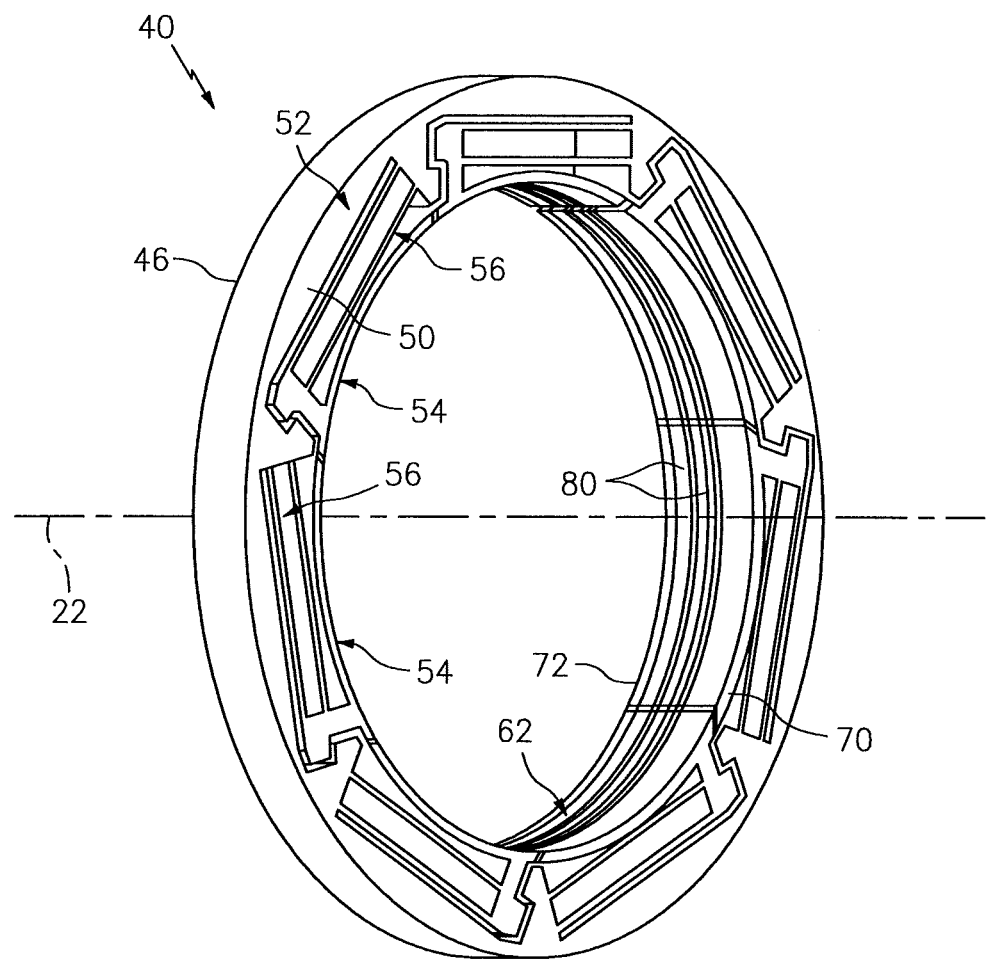
FIG. 2 is a perspective general representation of a primary seal device for the assembly of FIG. 1.

Referring to FIG. 2, the primary seal device 40 is configured as an annular non-contact seal device and, more particularly, a hydrostatic non-contact seal device. An example of such a hydrostatic non-contact seal device is a "HALO™" seal; however, the primary seal device 40 of the present disclosure is not limited to the foregoing exemplary hydrostatic non-contact seal device.

Figure 3:
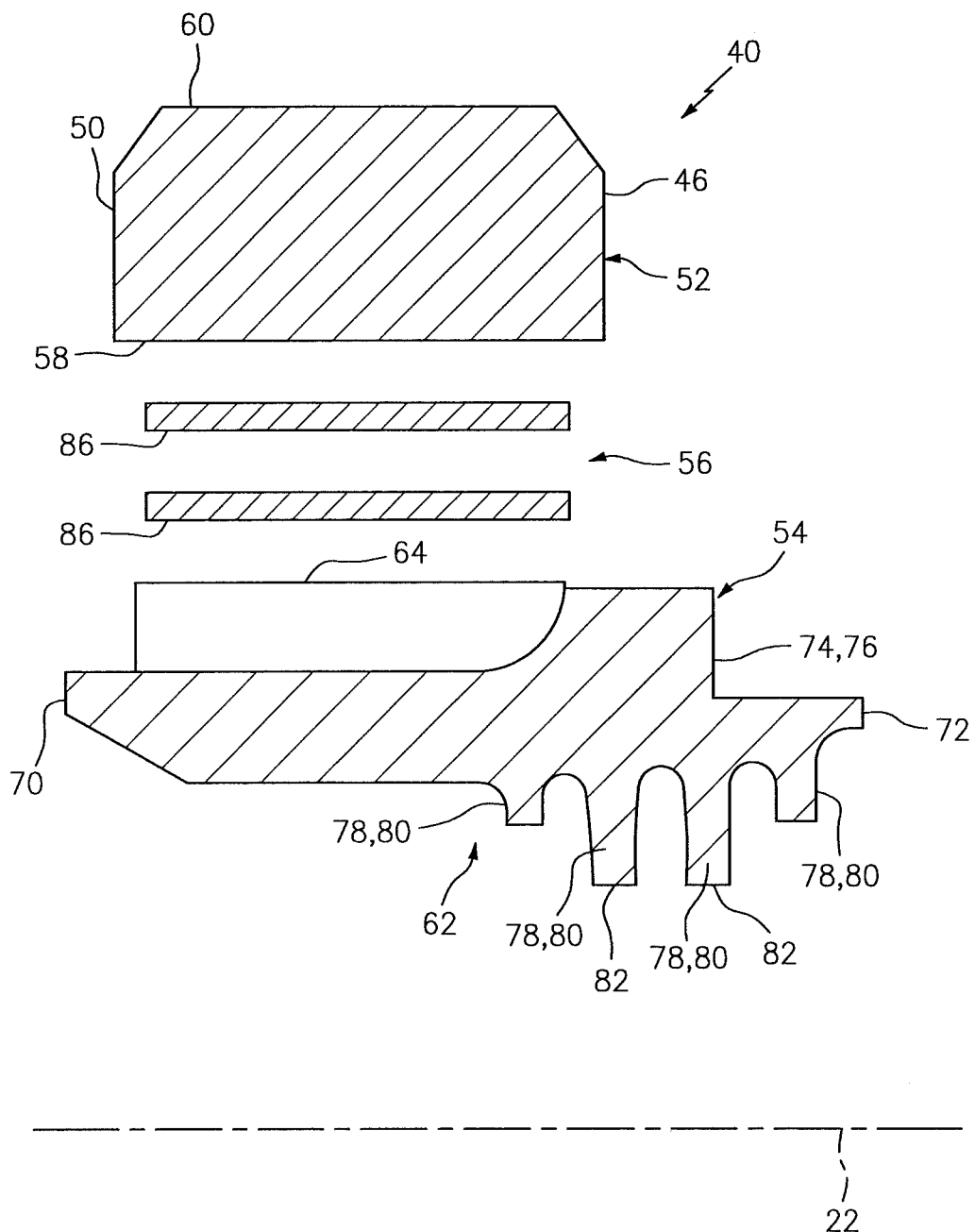
FIG. 3 is a top-half side sectional illustration of a primary seal device.
Figure 4:
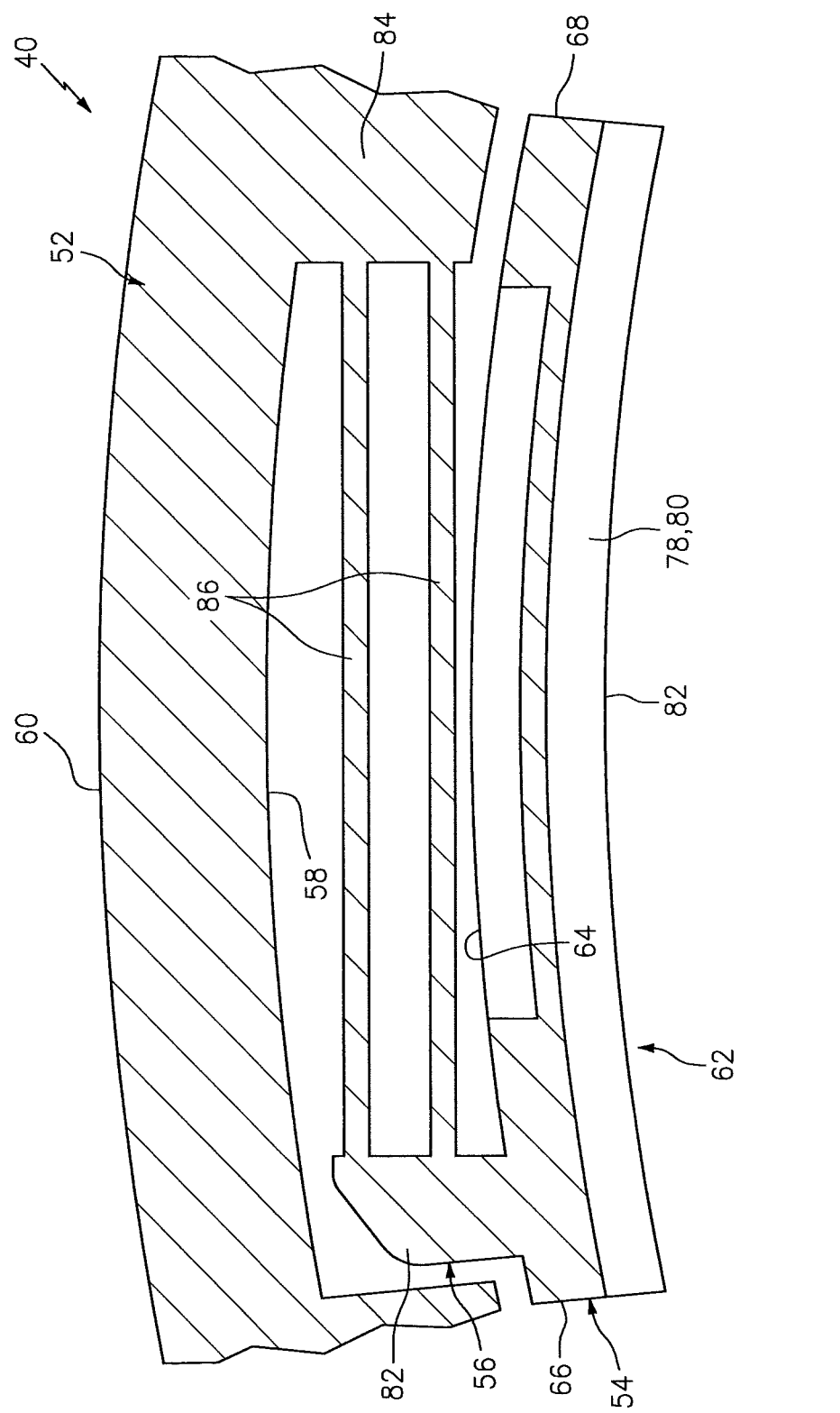
FIG. 4 is a cross-sectional illustration of a portion of the primary seal device of FIG. 2.

Referring to FIGS. 3 and 4, the primary seal device 40 includes a seal base 52, a plurality of seal shoes 54 and a plurality of spring elements 56. The seal base 52 is configured as an annular full hoop body, which extends circumferentially around the axial centerline 22. The seal base 52 is configured to circumscribe the seal shoes 54 as well as the spring elements 56. The seal base 52 extends axially along the axial centerline 22 between and forms the second end surface 46 and the first end surface 50. The seal base 52 extends radially between an inner radial base side 58 and an outer radial base side 60, which radially engages (e.g., is press fit against) the stator structure 24 and, more particularly, the seal carrier surface 34 (see FIG. 1).

Referring to FIG. 2, the seal shoes 54 are configured as arcuate bodies arranged circumferentially about the axial centerline 22 in an annular array. This annular array of the seal shoes 54 extends circumferentially around the axial centerline 22, thereby forming an inner bore at an inner radial side 62 of the primary seal device 40. As best seen in FIG. 1, the inner bore is sized to receive the seal land 36, where the rotor structure 26 projects axially through (or into) the inner bore formed by the seal shoes 54.

Referring to FIG. 4, each of the seal shoes 54 extends radially from the inner radial side 62 of the primary seal device 40 to an outer radial surface 64 of that seal shoe 54. Each of the seal shoes 54 extends circumferentially around the axial centerline 22 between opposing first and second circumferential sides 66 and 68 of that seal shoe 54.

Referring to FIG. 3, each of the seal shoes 54 extends axially along the axial centerline 22 between a first shoe end 70 and a second shoe end 72. The first shoe end 70 may be axially offset from and project axially away from the first end surface 50. The second shoe end 72 may be axially offset from and project axially away from the second end surface 46. The seal shoes 54 of the present disclosure, however, are not limited to such exemplary relationships.

Referring to FIG. 3, each of the seal shoes 54 includes an arcuate end surface 74 generally at (e.g., on, adjacent or proximate) the second shoe end 72. In the array (see FIG. 2), these arcuate end surfaces 74 collectively form a generally annular (but circumferentially segmented) end surface 76 configured for sealingly engaging with the secondary seal devices 42; see FIG. 1. The seal shoes 54 of the present disclosure, however, are not limited to the foregoing exemplary configuration.

Referring to FIGS. 3 and 4, each of the seal shoes 54 includes one or more arcuate protrusions 78, which collectively form one or more (e.g., a plurality of axially spaced) generally annular (e.g., circumferentially segmented) ribs 80 at the inner radial side 62. Distal inner radial ends 82 of one or more of these ribs 80 are configured to be arranged in close proximity with (but not touch) and thereby sealingly engage the seal land surface 38 in a non-contact manner (see FIG. 1), where the rotor structure 26 project axially through (or into) the inner bore formed by the seal shoes 54. The ribs 80 therefore are configured, generally speaking, as non-contact knife edge seal elements.

Referring to FIG. 2, the spring elements 56 are arranged circumferentially about the axial centerline 22 in an annular array. Referring again to FIGS. 3 and 4, the spring elements 56 are also arranged radially between the seal shoes 54 and the seal base 52. Each of the spring elements 56 is configured to connect a respective one of the seal shoes 54 with the seal base 52. The spring element 56 shown in FIG. 4, for example, includes one or more mounts 82 and 84 (e.g., generally radial fingers/projections) and one or more springs 86 (e.g., cantilever-leaf springs). The first mount 82 is connected to a respective one of the seal shoes 54 at (e.g., on, adjacent or proximate) the first circumferential side 66, where the opposing second circumferential side 68 of that seal shoe 54 is free floating. The second mount 84 is connected to the seal base 52, and is generally circumferentially aligned with or near the second circumferential side 68. The springs 86 are radially stacked and spaced apart with one another. Each of these springs 86 extends laterally (e.g., tangentially or circumferentially) from the first mount 82 to the second mount 84. These spring elements 56 may thereby laterally overlap a major circumferential portion (e.g., ~65-95%) of the seal shoe 54. The spring elements 56 of the present disclosure, however, are not limited to the foregoing exemplary configuration or values.

During operation of the primary seal device 40, rotation of the rotor structure 26 may develop aerodynamic forces and apply a fluid pressure to the seal shoes 54 causing the each seal shoe 54 to respectively move radially relative to the seal land surface 38. The fluid velocity may increase as a gap between the seal shoe 54 and seal land surface 38 increases, thus reducing pressure in the gap and drawing the seal shoe 54 radially inwardly toward the seal land surface 38. As the gap closes, the velocity may decrease and the pressure may increase within the gap, thus, forcing the seal shoe 54 radially outwardly from the seal land surface 38. The respective spring element 56 may deflect and move with the seal shoe 54 to create a primary seal of the gap between the seal land surface 38 and ribs 80 within predetermined design tolerances.

As described above, the radial in and out movement of the seal shoes 54 is influenced by the rotational velocity of the rotor structure 26. Where the rotational velocity (w) of the rotor structure 26 has a frequency ($f = w \div 2\pi$) that is substantially equal to a natural frequency of the seal shoes 54, the seal shoes 54 may be subject to natural vibrations. Such natural vibrations may result in one or more of the following:

cause one or more of the seal shoes 54 and, more particularly, one or more of the ribs 80 to radially contact the seal land surface 38 thereby wearing to one or more of those components 36 and 54;

induce relatively high stresses within one or more of the seal shoes 54, which may result in high cycle fatigue failure of one or more of those seal shoes 54; and increase leakage between one or more of the seal shoes 54 and the seal land surface 38 as a result of an uneven gap between those components 36 and 54.

The natural frequency of a seal shoe 54 is influenced by the mass of that seal shoe 54 and the stiffness of the spring elements 56 that attach seal shoe 54 to the seal base 52. Increasing the stiffness of the spring elements 56, for example, may increase the natural frequency of that seal shoe 54. In another example, decreasing the mass of the seal shoe 54 may increase the natural frequency of that seal shoe 54.

Figure 5:
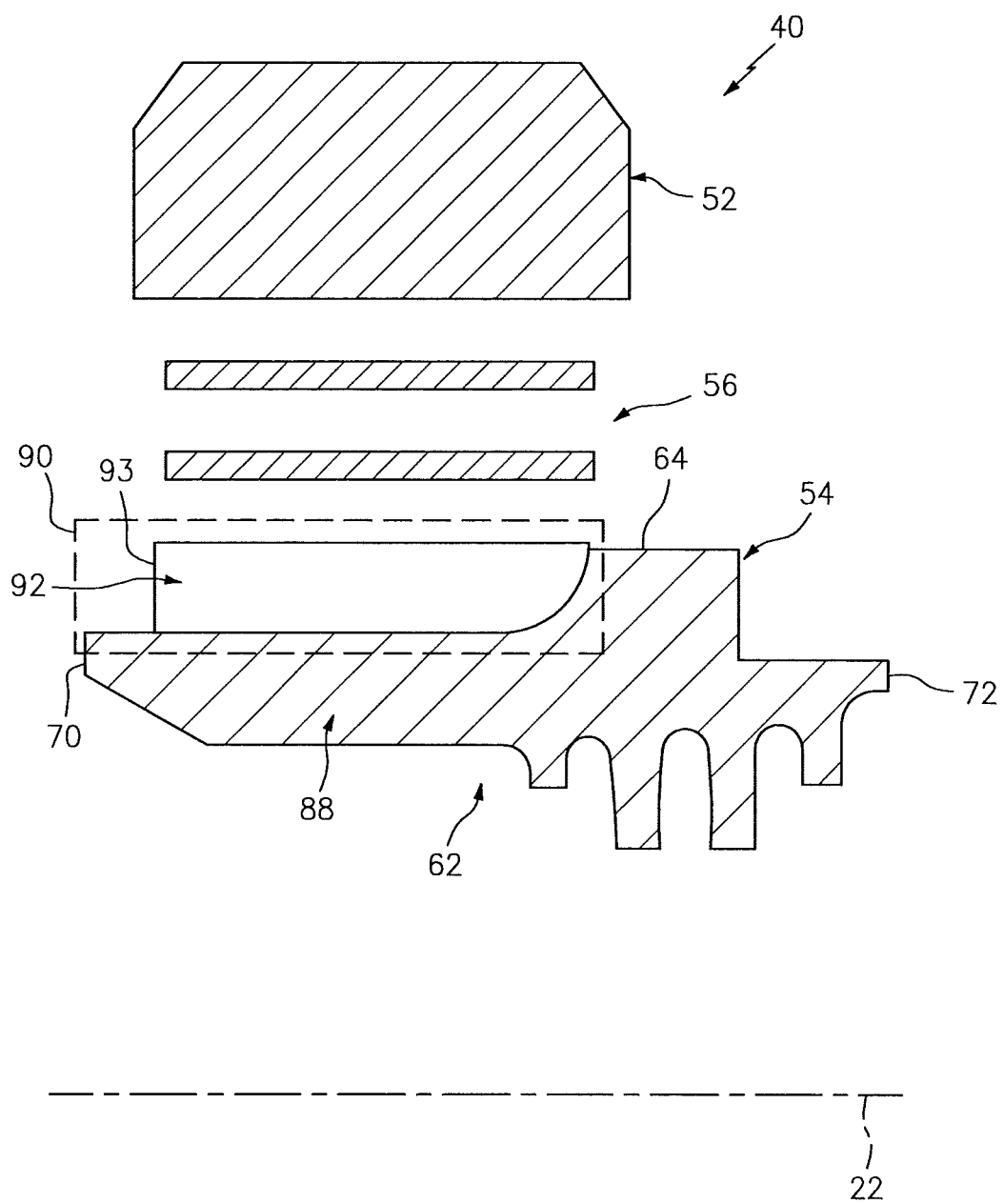
FIG. 5 is another top-half side sectional illustration of the primary seal device of FIG. 2.
Figure 6:
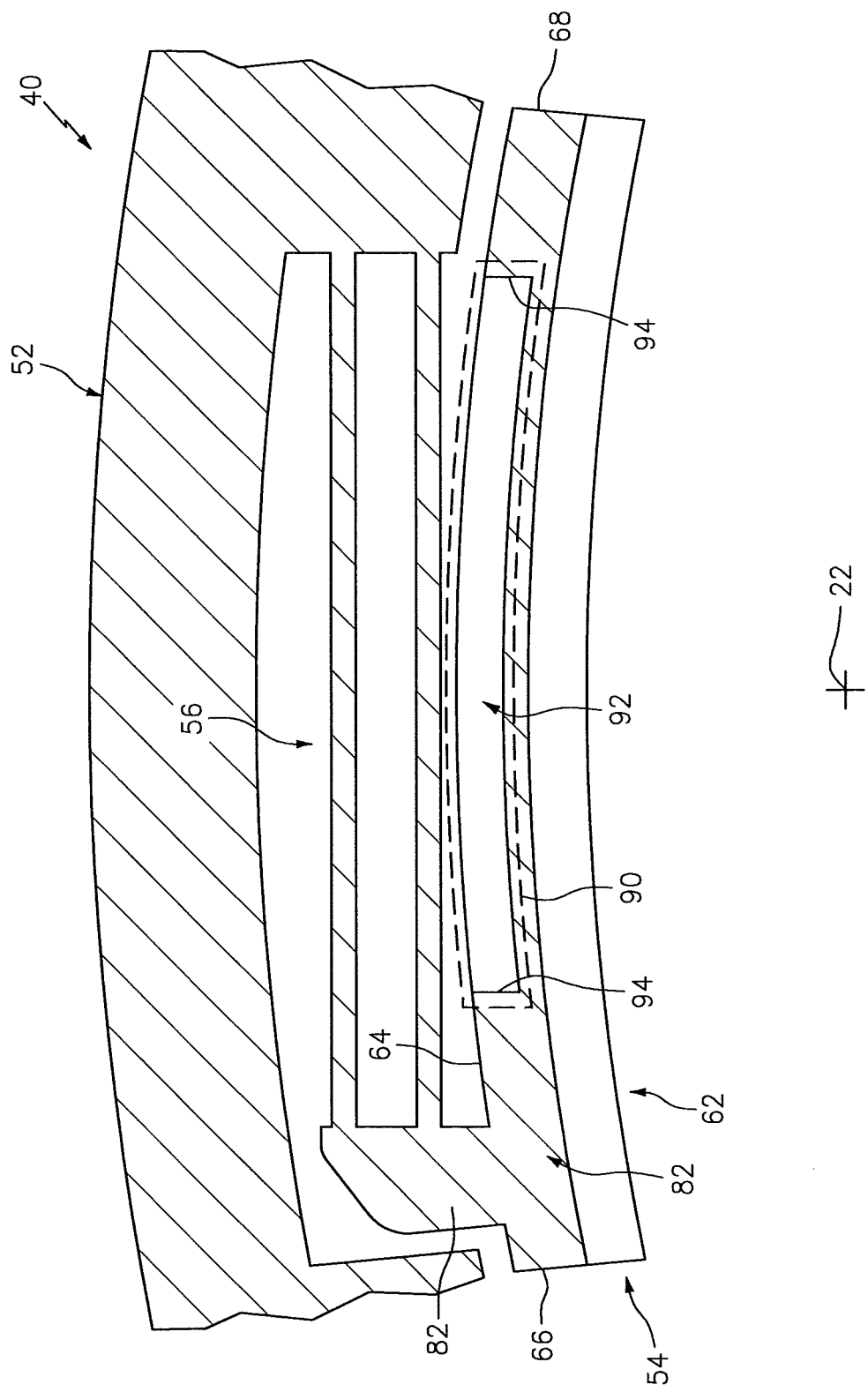
FIG. 6 is another cross-sectional illustration of a portion of the primary seal device of FIG. 2.

In recognition of the foregoing, one or more or each of the seal shoes 54 of FIGS. 5 and 6 includes at least a major region 88 and at least one minor region 90. In the exemplary embodiment of FIGS. 5 and 6, the minor region 90 is generally designated by areas encircled by dashed lines. The major region 88 of FIGS. 5 and 6 generally includes the remaining portion of the seal shoe 54 outside of the dashed lines. The term "major region" may describe a region of a seal shoe 54 that accounts for a majority (e.g., more than fifty percent) of a volume and/or a mass of that seal shoe 54, where the major region 88 has a first mass/volume ratio (e.g., density). The term "minor region" may describe a region of a seal shoe 54 that accounts for a minority (e.g., less than fifty percent) of the volume and/or the mass of the seal shoe 54, where the minor region 90 has a second mass/volume ratio that is less than the first mass/volume ratio.

Figure 7:
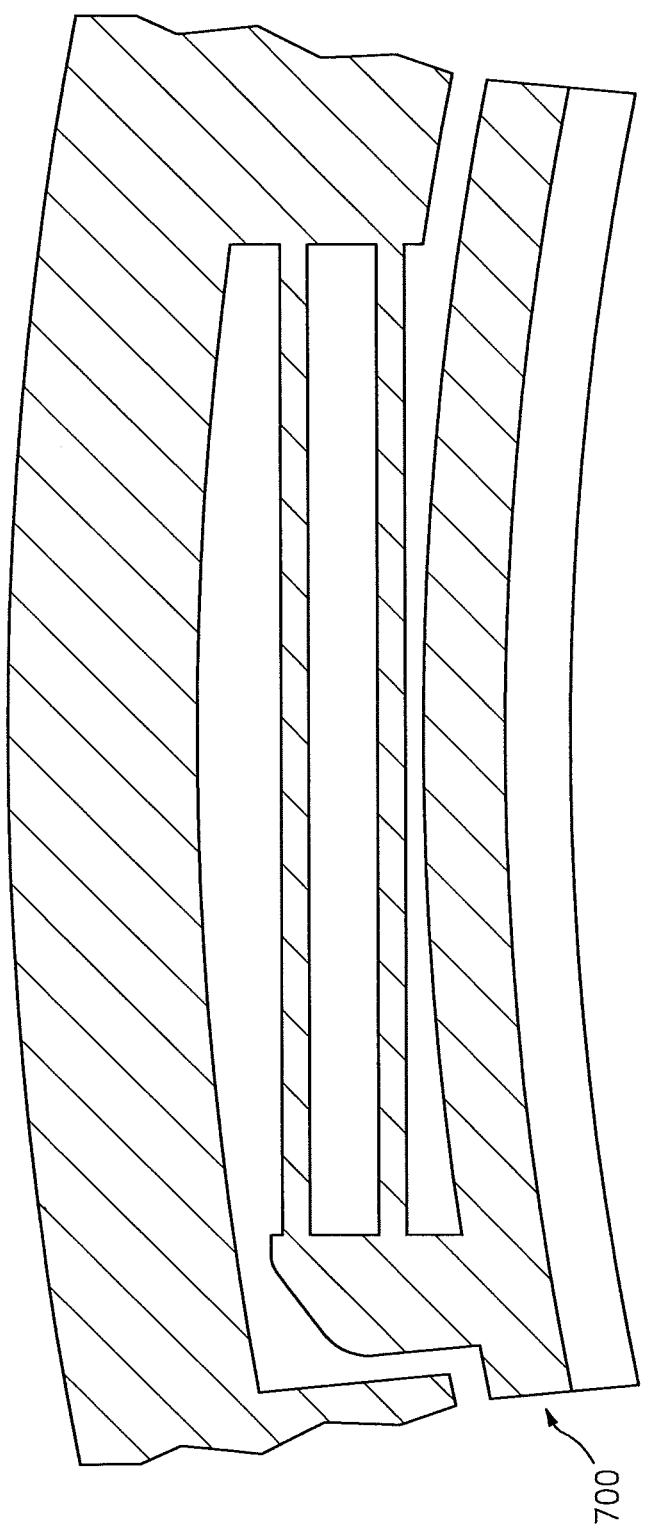
FIG. 7 is a cross-sectional illustration of a portion of another primary seal device.

The minor region 90 is configured with the major region 88 to tune the natural frequency of the respective seal shoe 54. In particular, the minor region 90 is configured with the major region 88 to increase the natural frequency of the respective seal shoe 54 to a value that is above the frequency (f) of the rotor structure 26 at, for example, normal speed operation or high (e.g., maximum) speed operation. Here, in comparison to a seal shoe 700 as shown in FIG. 7 without major and minor regions 88 and 90, the natural frequency of the seal shoe 54 of FIGS. 5 and 6 is increased by reducing the mass of the seal shoe 54 while, for example, substantially maintaining the stiffness of the spring elements 56. In this manner, the respective seal shoe 54 may be operable to significantly reduce or eliminate natural vibrations thereof during operation of the rotational equipment. Of course, in other embodiments, the minor region 90 may be configured with the major region 88 to increase the natural frequency of the respective seal shoe 54 to a value that is between about 50% to about 90% (or another percentage) of the frequency (f) of the rotor structure 26 at the normal speed operation or high (e.g., maximum) speed operation.

Figure 8:
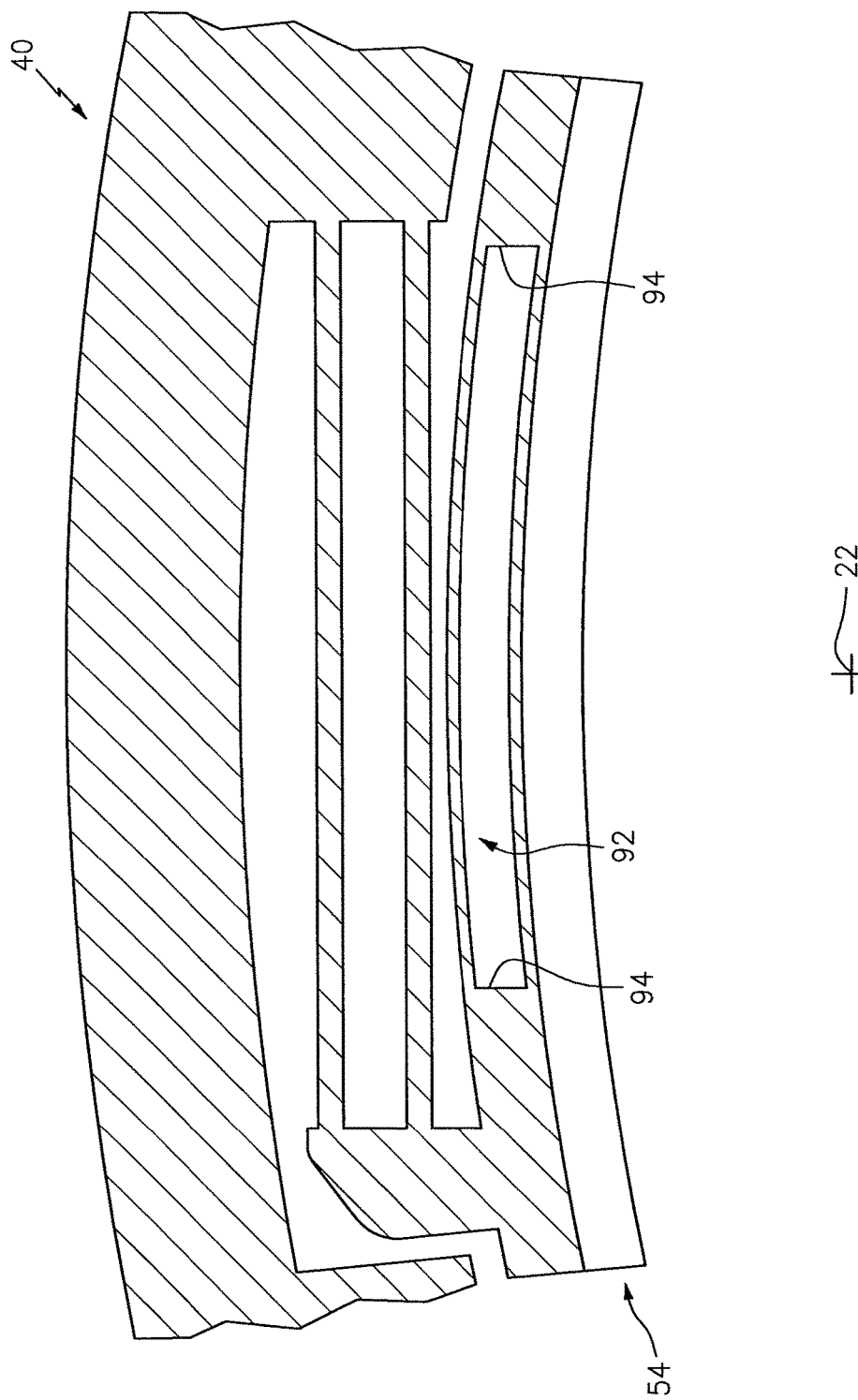
FIG. 8 is a cross-sectional illustration of a portion of another primary seal device.

The minor region 90 of FIGS. 5 and 6 includes a portion of the seal shoe 54 with at least one aperture 92; e.g., a notch, an indentation, a drill-hole, etc. This aperture 92 extends partially into (e.g., not through) the seal shoe 54 from the first shoe end 70. More particularly, the aperture 92 extends partially into the seal shoe 54 from a surface 93 at (e.g., on, adjacent or proximate) the first shoe end 70. The aperture 92 also extends laterally (e.g., circumferentially or tangentially) within (e.g., not into or through) the seal shoe 54. The aperture 92 of FIGS. 5 and 6 also extends radially inward (e.g., not through) into the seal shoe 54 from the outer radial surface 64 of that seal shoe 54. However, in other embodiments as shown in FIG. 8, the aperture 92 may extend radially within (e.g., not into or through) the seal shoe 54.

Referring again to FIGS. 5 and 6, the aperture 92 may be centrally located laterally between the first circumferential side 66 and the second circumferential side 68. In other embodiments, however, the aperture 92 may be located more towards or at one of the circumferential sides 66, 68. That said, the aperture 92 generally should not be circumferentially aligned or directly adjacent with the first mount 82 to reduce or prevent high stress concentrations in the seal shoe proximate the first mount 82.

Figure 9:
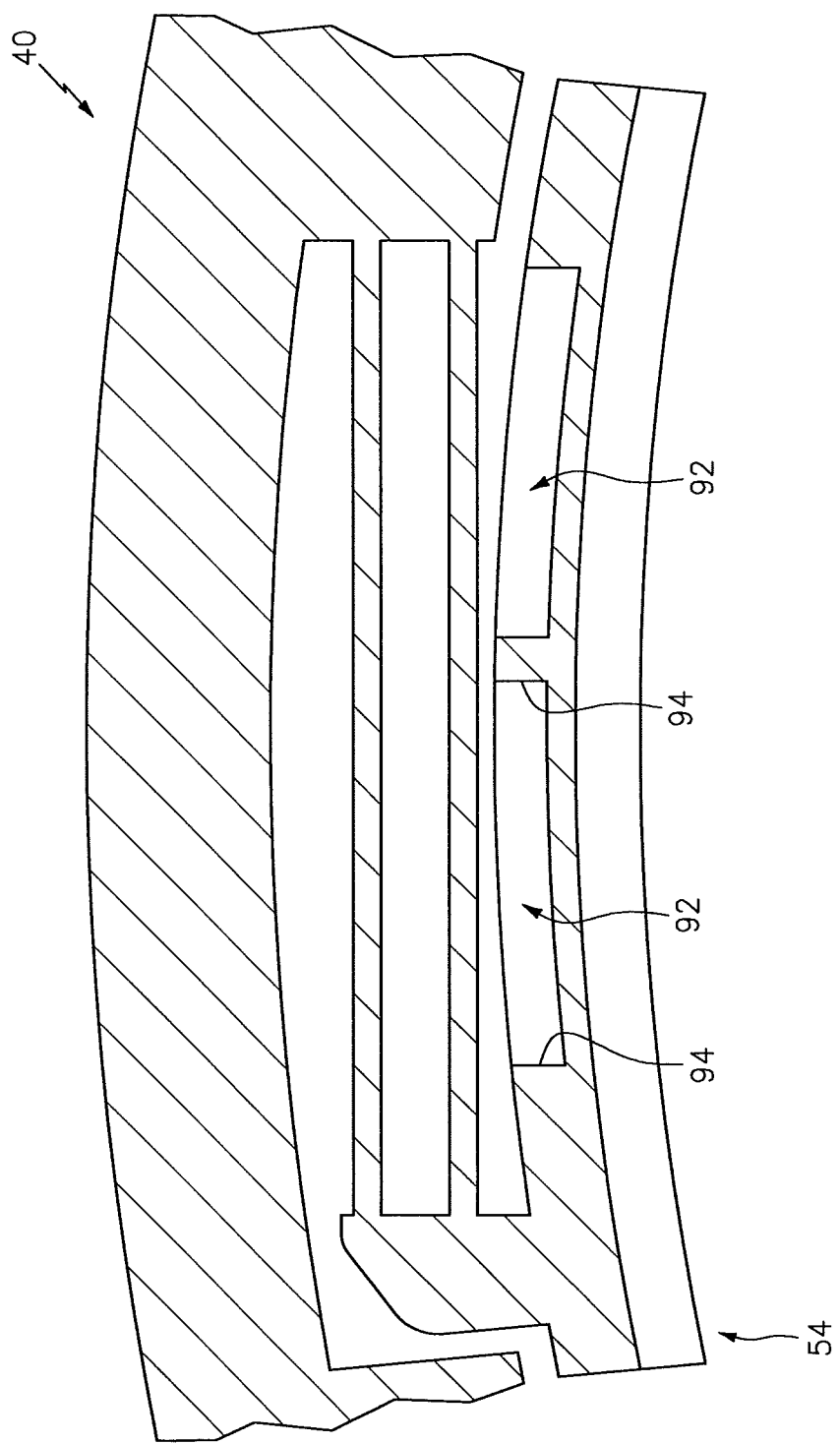
FIG. 9 is a cross-sectional illustration of a portion of another primary seal device.
Figure 10:
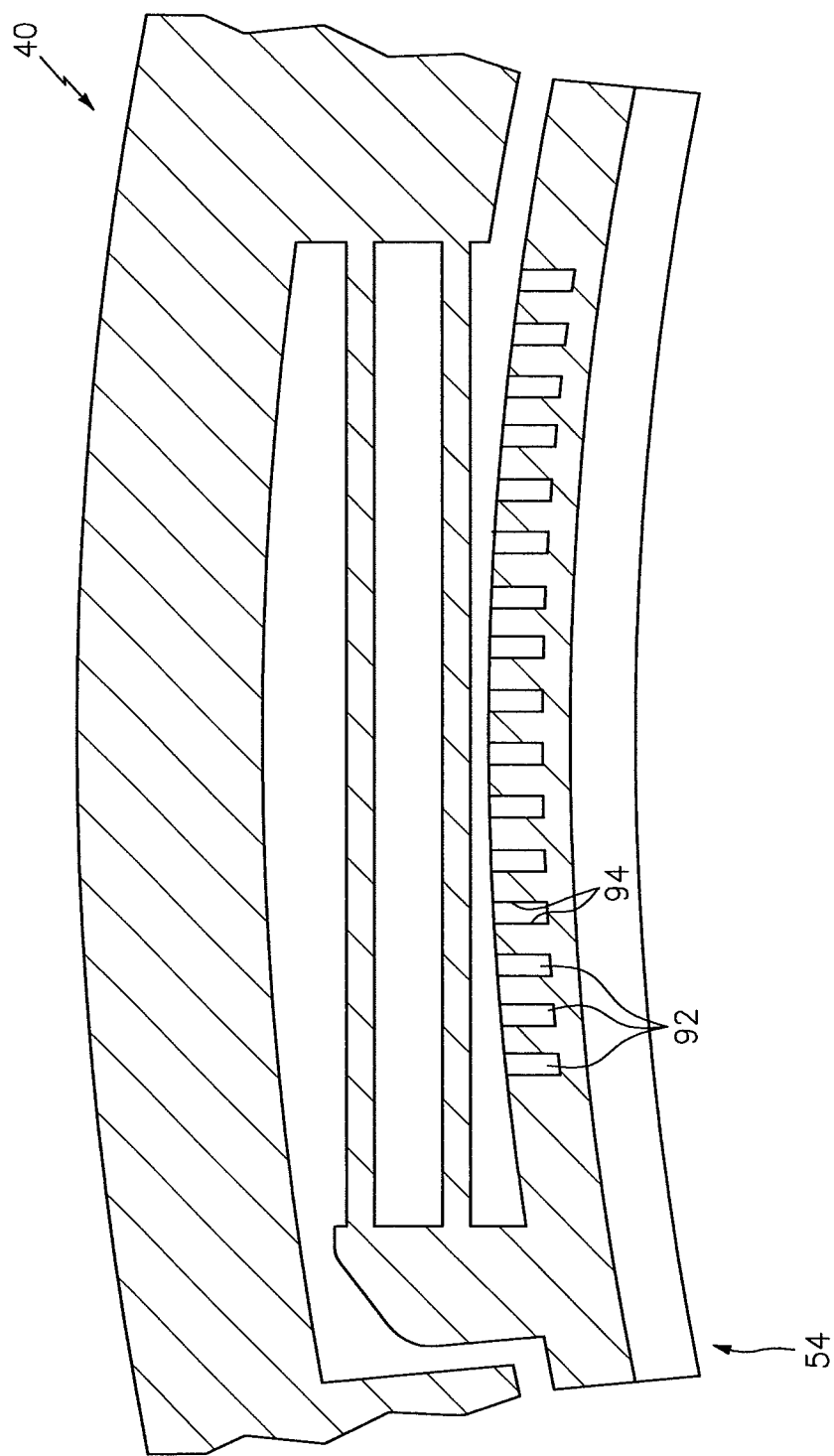
FIG. 10 is a cross-sectional illustration of a portion of another primary seal device.
Figure 11:
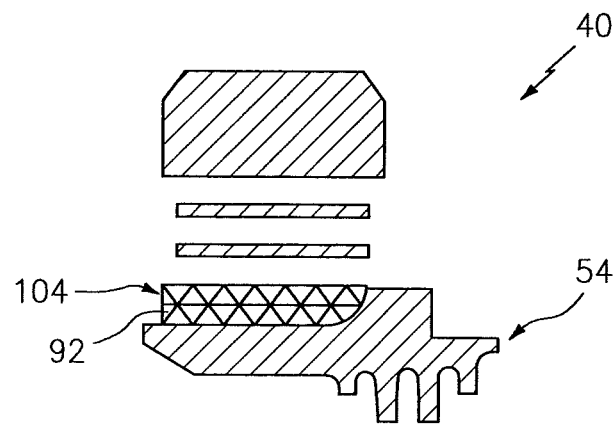
FIG. 11 is a top-half side sectional illustration of another primary seal device.
Figure 12:
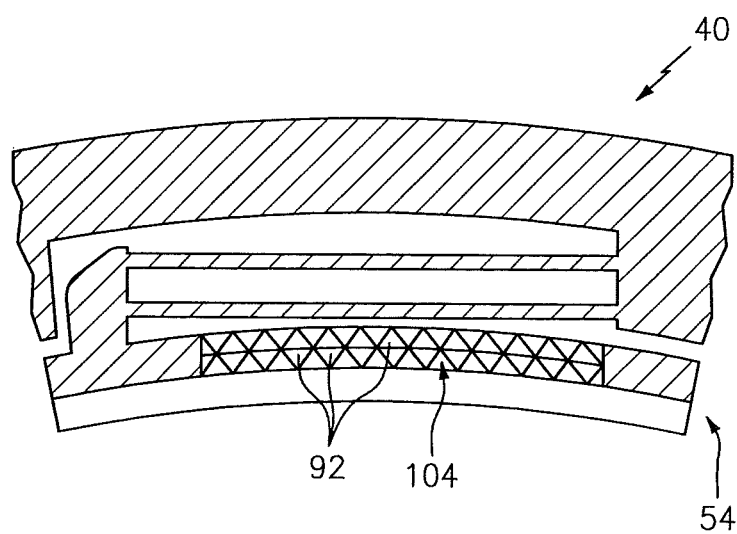
FIG. 12 is a cross-sectional illustration of a portion of the primary seal device of FIG. 11.
Figure 14:
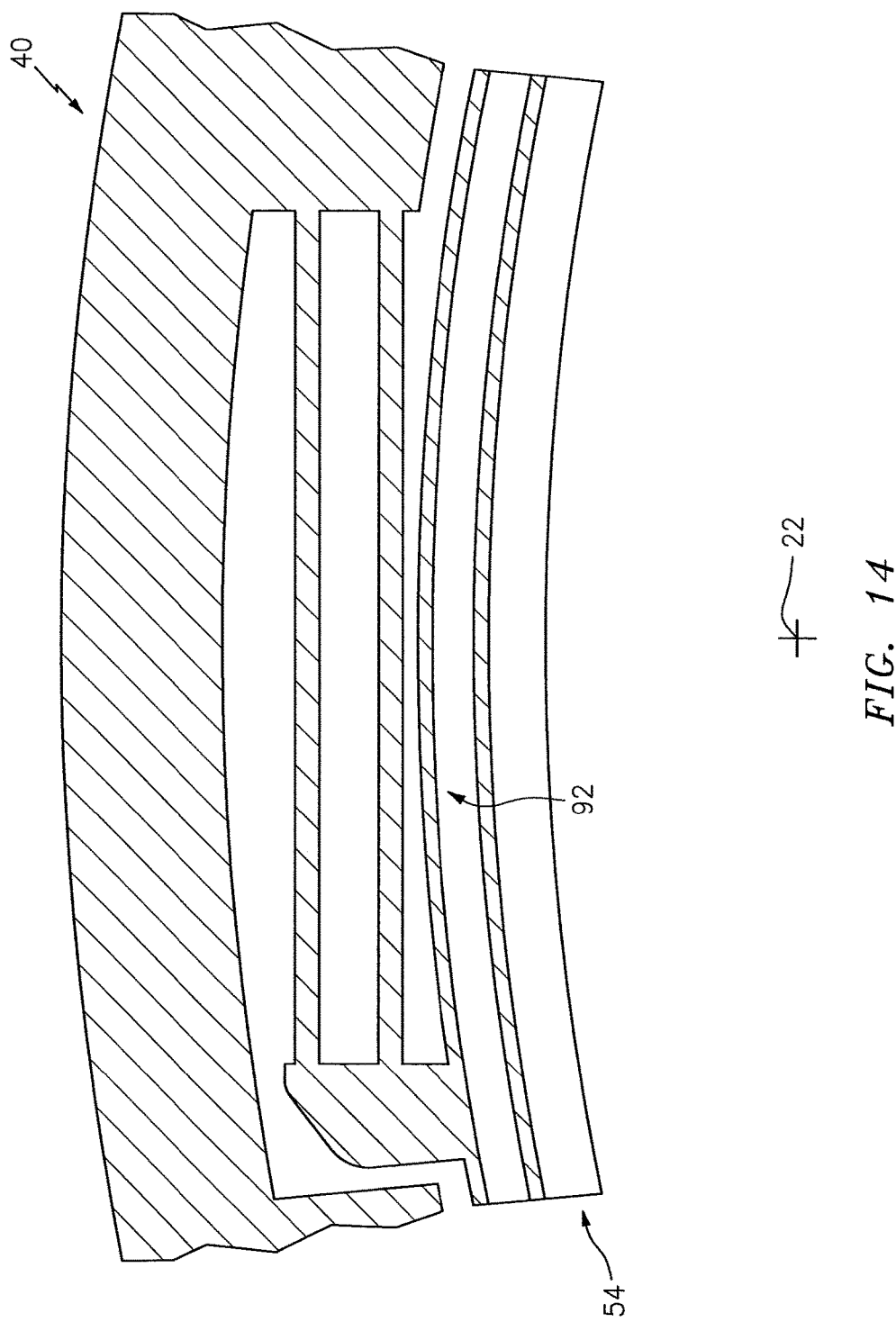
FIG. 14 is a cross-sectional illustration of a portion of another primary seal device.

The aperture 92 of FIG. 6 has an aperture length defined laterally between opposing surfaces 94 which form distal lateral ends of that aperture 92. This aperture length may be between about fifty percent and about eighty percent of a length of the seal shoe 54. This seal shoe length is defined circumferentially between the first circumferential side 66 and the second circumferential side 68. However, in other embodiments as shown in FIG. 9, the aperture length may be between about ten percent and about fifty percent of the seal shoe length. In still other embodiments as shown in FIGS. 10 to 12, the aperture length may be between about one percent and about ten percent of the seal shoe length. The present disclosure, however, is not limited to the foregoing exemplary embodiments or values. For example, in some embodiments, the aperture length may be equal to the length of the seal shoe 54; e.g., see FIG. 14.

Referring again to FIG. 1, while the primary seal device 40 is operable to generally seal the annular gap 30 between the stator structure 24 and the rotor structure 26 as described above, fluid (e.g., gas) may still flow axially through passages 96 defined by radial gaps between the components 52, 54 and 56. The secondary seal devices 42 therefore are provided to seal off these passages 96 and, thereby, further and more completely seal the annular gap 30.

Each of the secondary seal devices 42 may be configured as a ring seal element such as, but not limited to, a split ring. Alternatively, one or more of the secondary seal devices 42 may be configured as a full hoop body ring, an annular brush seal or any other suitable ring-type seal.

The secondary seal devices 42 of FIG. 1 are arranged together in an axial stack. In this stack, each of the secondary seal devices 42 axially engages (e.g., contacts) another adjacent one of the secondary seal devices 42. The stack of the secondary seal devices 42 is arranged with the first ring structure 44, which positions and mounts the secondary seal devices 42 with the stator structure 24 adjacent the primary seal device 40. In this arrangement, the stack of the secondary seal devices 42 is operable to axially engage and form a seal between the end surface 76 of the array of the seal shoes 54 and an annular surface 98 of the first ring structure 44. These surfaces 76 and 98 are axially aligned with one another, which enables the stack of the secondary seal devices 42 to slide radially against, but maintain sealingly engagement with, the end surface 76 as the seal shoes 54 move radially relative to the seal land surface 38 as described above.

The first ring structure 44 may include a secondary seal device support ring 100 and a retention ring 102. The support ring 100 is configured with an annular full hoop body, which extends circumferentially around the axially centerline 22. The support ring 100 includes the annular surface 98, and is disposed axially adjacent and engaged with the seal base 52.

The retention ring 102 is configured with an annular full hoop body, which extends circumferentially around the axially centerline 22. The retention ring 102 is disposed axially adjacent and engaged with the support ring 100, thereby capturing the stack of the secondary seal devices 42 within an annular channel formed between the rings 100 and 102. The stack of the secondary seal devices 42, of course, may also or alternatively be attached to one of the rings 100 and 102 by, for example, a press fit connection and/or otherwise.

In some embodiments, one or more of the apertures 92 may be configured as open apertures. The term "open aperture" may describe an aperture which is not filled with solid material, but occupied by a fluid such as air.

In some embodiments, one or more of the apertures 92 may be at least partially or completely filled with another material. This other material may have a density that is less than a density of the material from which another portion (e.g., the remaining portion) of the seal shoe 54 body is formed. For example, the filler material may be a cellular material such a metal foam, whereas the remainder of the seal shoe 54 may be formed from a billet of material such as metal. The composition of such filler material may be the same or different than the billet of material. The seal shoe 54 of the present disclosure, however, is not limited to the foregoing exemplary materials.

In some embodiments, referring to FIGS. 11 and 12, some or all of the apertures 92 in the minor region 90 may be formed by cellular structure 104; e.g., a lattice structure (see FIGS. 11 and 12), an open or closed cell foam structure, etc. Such a cellular structure 104, of course, may have various configurations other than that illustrated in FIGS. 11 and 12. The lattice structure 104 may be formed using additive manufacturing (e.g., 3D printing) and/or various other manufacturing techniques.

The present disclosure is not limited to the exemplary primary seal device type or configuration described above. Various other non-contact seals are known in the art and may be reconfigured in light of the disclosure above to be included with the assembly 20 of the present disclosure. Other examples of non-contact seals are disclosed in U.S. Pat. No. 8,172,232; U.S. Pat. No. 8,002,285; U.S. Pat. No. 7,896,352; U.S. Pat. No. 7,410,173; U.S. Pat. No. 7,182,345;

and U.S. Pat. No. 6,428,009, each of which is hereby incorporated herein by reference in its entirety.

Figure 13:
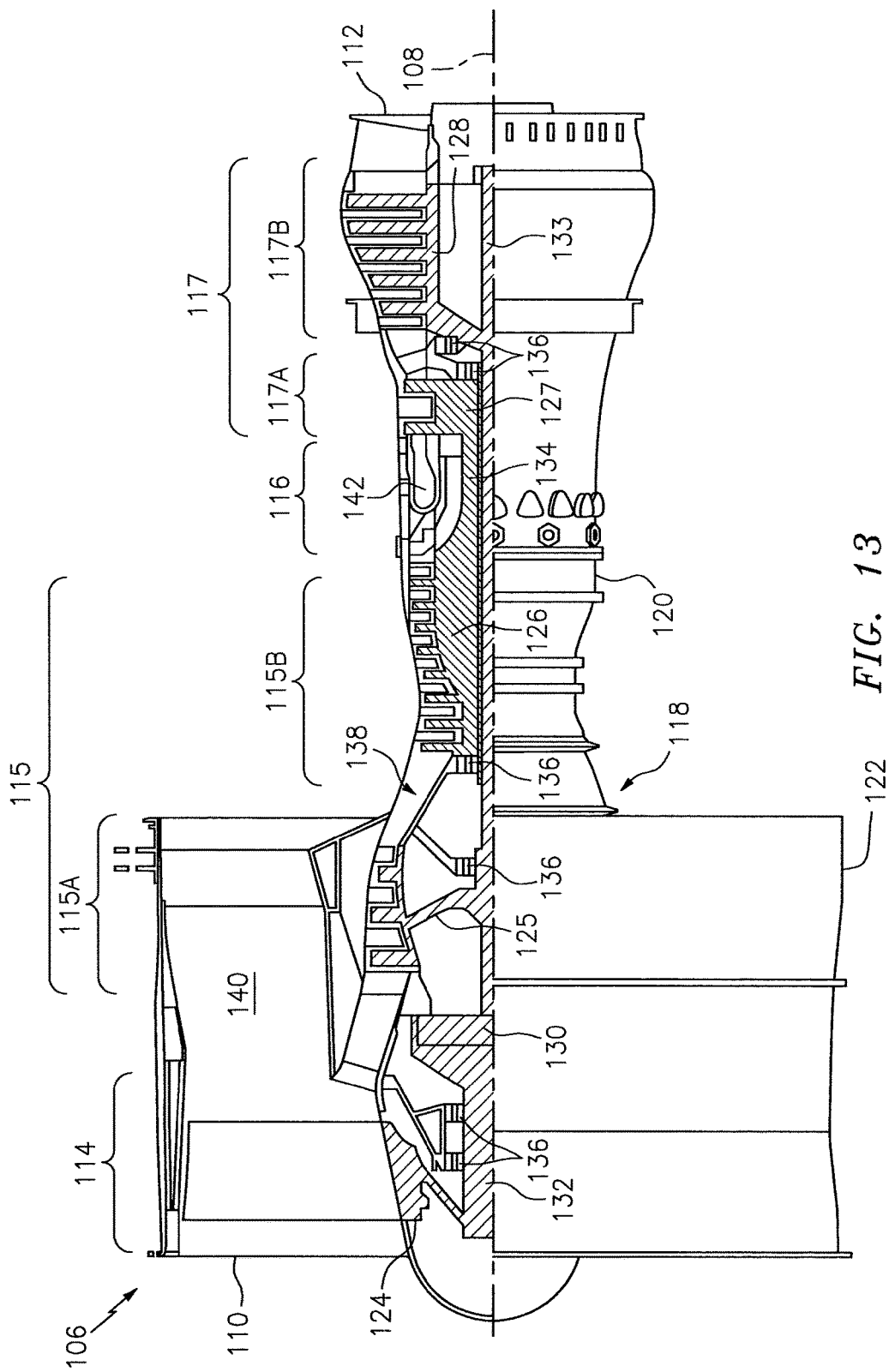
FIG. 13 is a side cutaway illustration of a gas turbine engine.

As described above, the assembly 20 of the present disclosure may be configured with various different types and configurations of rotational equipment. FIG. 13 illustrates one such type and configuration of the rotational equipment—a geared turbofan gas turbine engine 106. Such a turbine engine 106 includes various stator structures (e.g., bearing supports, hubs, cases, etc.) as well as various rotor structures (e.g., rotor disks, shafts, etc.) as described below, where the stator structure 24 and the rotor structure 26 can respectively be configured as anyone of the foregoing structures in the turbine engine 106 of FIG. 13, or other structures not mentioned herein.

Referring still to FIG. 13, the turbine engine 106 extends along an axial centerline 108 (e.g., the centerline 22) between an upstream airflow inlet 110 and a downstream airflow exhaust 112. The turbine engine 106 includes a fan section 114, a compressor section 115, a combustor section 116 and a turbine section 117. The compressor section 115 includes a low pressure compressor (LPC) section 115A and a high pressure compressor (HPC) section 115B. The turbine section 117 includes a high pressure turbine (HPT) section 117A and a low pressure turbine (LPT) section 117B.

The engine sections 114-117 are arranged sequentially along the centerline 108 within an engine housing 118, a portion or component of which may include or be connected to the stator structure 24. This housing 118 includes an inner case 120 (e.g., a core case) and an outer case 122 (e.g., a fan case). The inner case 120 may house one or more of the engine sections; e.g., an engine core. The outer case 122 may house at least the fan section 114.

Each of the engine sections 114, 115A, 115B, 117A and 117B includes a respective rotor 124-128. Each of these rotors 124-128 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 124 is connected to a gear train 130, for example, through a fan shaft 132. The gear train 130 and the LPC rotor 125 are connected to and driven by the LPT rotor 128 through a low speed shaft 133. The HPC rotor 126 is connected to and driven by the HPT rotor 127 through a high speed shaft 134. The shafts 132-134 are rotatably supported by a plurality of bearings 136; e.g., rolling element and/or thrust bearings. Each of these bearings 136 is connected to the engine housing 118 by at least one stationary structure such as, for example, an annular support strut.

During operation, air enters the turbine engine 106 through the airflow inlet 110. This air is directed through the fan section 114 and into a core gas path 138 and a bypass gas path 140. The core gas path 138 flows sequentially through the engine sections 115-117. The bypass gas path 140 flows away from the fan section 114 through a bypass duct, which circumscribes and bypasses the engine core. The air within the core gas path 138 may be referred to as "core air". The air within the bypass gas path 140 may be referred to as "bypass air".

The core air is compressed by the compressor rotors 125 and 126 and directed into a combustion chamber 142 of a combustor in the combustor section 116. Fuel is injected into the combustion chamber 142 and mixed with the compressed core air to provide a fuel-air mixture. This fuel air mixture is ignited and combustion products thereof flow through and sequentially cause the turbine rotors 127 and 128 to rotate. The rotation of the turbine rotors 127 and 128 respectively drive rotation of the compressor rotors 126 and 125 and, thus, compression of the air received from a core airflow inlet. The rotation of the turbine rotor 128 also drives rotation of the fan rotor 124, which propels bypass air through and out of the bypass gas path 140. The propulsion of the bypass air may account for a majority of thrust generated by the turbine engine 106, e.g., more than seventy-five percent (75%) of engine thrust. The turbine engine 106 of the present disclosure, however, is not limited to the foregoing exemplary thrust ratio.

The assembly 20 may be included in various aircraft and industrial turbine engines other than the one described above as well as in other types of rotational equipment; e.g., wind turbines, water turbines, rotary engines, etc. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 13), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A non-contact seal assembly, comprising:
  a plurality of seal shoes arranged about a centerline in an annular array, the seal shoes including a first seal shoe extending axially along the centerline between a first shoe end and a second shoe end, wherein an aperture extends partially axially into the first seal shoe from the first shoe end and laterally within the first seal shoe;
  a seal base circumscribing the annular array of the seal shoes; and
  a spring element radially between and connecting the first seal shoe with the seal base.

2. The assembly of claim 1, wherein the aperture extends partially radially into the first seal shoe from an outer radial surface of the first seal shoe.

3. The assembly of claim 1, wherein the aperture extends radially within the first seal shoe.

4. The assembly of claim 1, wherein the aperture is one of a plurality of apertures extending axially into the first seal shoe from the first shoe end and circumferentially within the first seal shoe.

5. The assembly of claim 4, wherein the apertures are formed by a lattice structure.

6. The assembly of claim 1, wherein the aperture is an open aperture.

7. The assembly of claim 1, wherein the aperture is at least partially filled with a material having a density which is less than material from which another portion of the first seal shoe is formed.

8. The assembly of claim 1, wherein
the first seal shoe extends circumferentially, at the first shoe end, between a first shoe side and a second shoe side for a seal shoe length; and
the aperture extends laterally within the first seal shoe for an aperture length which is between about fifty percent and about eighty percent of the seal shoe length.

9. The assembly of claim 1, wherein
the first seal shoe extends circumferentially, at the first shoe end, between a first shoe side and a second shoe side for a seal shoe length; and
the aperture extends laterally within the first seal shoe for an aperture length which is between about ten percent and about fifty percent of the seal shoe length.

10. The assembly of claim 1, wherein
the first seal shoe extends circumferentially, at the first shoe end, between a first shoe side and a second shoe side for a seal shoe length; and
the aperture extends laterally within the first seal shoe for an aperture length which is between about one percent and about ten percent of the seal shoe length.

11. The assembly of claim 1, wherein the seal shoes collectively form a substantially annular end surface at the second end.

12. The assembly of claim 11, further comprising:
a ring structure axially engaged with the seal base; and
a secondary seal device mounted with the ring structure and axially engaged with the substantially annular end surface;
wherein the secondary seal device is configured to substantially seal an annular gap between the ring structure and the annular array of the seal shoes.

13. A non-contact seal assembly, comprising:
a plurality of seal shoes arranged about a centerline in an annular array, the seal shoes includes a first seal shoe extending axially along the centerline between a first shoe end and a second shoe end, the first seal shoe comprising a major region and a minor region disposed within the major region at the first shoe end, wherein the minor region has a mass/volume ratio that is less than a mass/volume ratio of the major region;
a seal base circumscribing the annular array of the seal shoes; and
a spring element radially between and connecting the first seal shoe with the seal base.

14. The assembly of claim 13, wherein the minor region is configured as a portion of the first seal shoe at the first shoe end with a plurality of apertures therein.

15. The assembly of claim 14, wherein a first of the apertures extends partially axially into the first seal shoe from the first shoe end and laterally within the first seal shoe.

16. The assembly of claim 13, wherein the minor region is configured with a lattice structure.

17. The assembly of claim 13, wherein the minor region is configured with a cellular structure.

18. The assembly of claim 13, wherein the major region comprises a first material and the minor region comprises a second material different from the first material.

19. A non-contact seal assembly, comprising:
a plurality of seal shoes arranged about a centerline in an annular array, the seal shoes including a first seal shoe extending axially along the centerline between a first shoe end and a second shoe end, wherein an aperture extends partially axially into the first seal shoe from the first shoe end and laterally through the first seal shoe along an entire lateral length of the first seal shoe;
a seal base circumscribing the annular array of the seal shoes; and
a spring element radially between and connecting the first seal shoe with the seal base.

20. An assembly for rotational equipment with an axial centerline, the assembly comprising:
a stator structure;
a rotor structure; and
a seal assembly configured to substantially seal an annular gap between the stator structure and the rotor structure, the seal assembly comprising a hydrostatic non-contact seal device including a plurality of seal shoes, a seal base and a spring element;
the seal shoes arranged about a centerline in an annular array, the seal shoes sealingly engaging the rotor structure and including a first seal shoe extending axially along the centerline between a first shoe end and a second shoe end, wherein an aperture extends partially axially into the first seal shoe from the first shoe end and laterally within the first seal shoe, wherein the seal shoes circumscribe and sealingly engage the rotor structure;
the seal base circumscribing the annular array of the seal shoes, the seal base mounted with the stator structure; and
the spring element radially between and connecting the first seal shoe with the seal base.

21. A non-contact seal assembly, comprising:
a plurality of seal shoes arranged about a centerline in an annular array, the seal shoes including a first seal shoe extending axially along the centerline between a first shoe end and a second shoe end, wherein an aperture extends axially into the first seal shoe from the first shoe end and radially within the first seal shoe;
a seal base circumscribing the annular array of the seal shoes; and
a spring element radially between and connecting the first seal shoe with the seal base.

* * * * *